H. P. BASSETT.
COMBINED PROCESS OF TREATING FELDSPATHIC AND PHOSPHATE ROCK.
APPLICATION FILED DEC. 26, 1913.
1,172,420.
Patented Feb. 22, 1916.
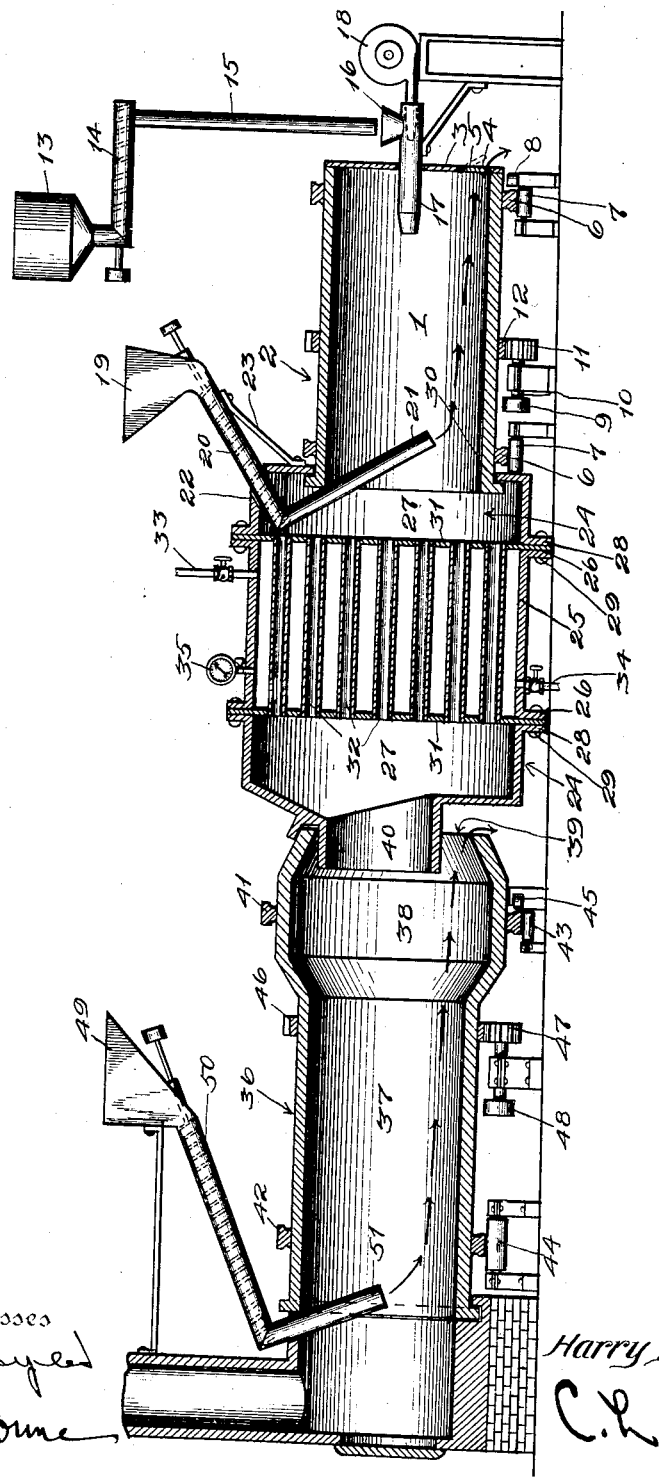

UNITED STATES PATENT OFFICE.

HARRY P. BASSETT, OF CATONSVILLE, MARYLAND, ASSIGNOR TO THE SPAR CHEMICAL COMPANY, OF BALTIMORE, MARYLAND, A CORPORATION OF MARYLAND.

COMBINED PROCESS OF TREATING FELDSPATHIC AND PHOSPHATE ROCK.

1,172,420. Specification of Letters Patent. Patented Feb. 22, 1916.

Application filed December 26, 1913. Serial No. 808,845.

*To all whom it may concern:*

Be it known that I, HARRY P. BASSETT, a citizen of the United States, residing at Catonsville, in the county of Baltimore and State of Maryland, have invented certain new and useful Improvements in Combined Processes of Treating Feldspathic and Phosphate Rock, of which the following is a specification.

This invention relates generally to processes of producing water soluble potassium salts from materials containing insoluble potassium salts, such as feldspathic rock, green marl sand and the like, and has particular reference to a combined process of rendering normally insoluble potassium salts soluble and rendering phosphate rock available for use as a fertilizer.

In the practice of my process in its preferred embodiment, I reduce the material containing insoluble potassium salts to a finely divided condition, preferably by grinding it so that it will pass through a twenty or forty mesh sieve and mix it with an alkali metal sulfate, preferably sodium acid sulfate, and a small amount of a reducing agent such as carbon. The mixture is heated to a red heat, preferably about 1100° F. and the fumes from the reaction, after being cooled somewhat, are caused to react upon phosphate rock preferably ground so that it will pass through a twenty or forty mesh sieve.

In the treatment of feldspathic rock, the materials are preferably mixed in the following proportions, by weight: feldspar, 50 parts; sodium acid sulfate, 100 parts; carbon, 1 to 3 parts. The mixture is then heated, preferably in a tube furnace, to a temperature of about 1100° F. for from twenty to forty minutes, the heating being continued until the potassium salts are nearly or wholly transformed into a water soluble form.

Instead of mixing a reducing agent with the feldspar and acid sulfate I have found in practice, that I can secure satisfactory results by subjecting a mixture of feldspathic rock and sodium acid sulfate to a red heat in a reducing atmosphere, preferably by heating the mixture in a reducing flame.

The treated material may be leached with water and the sodium sulfate and potassium sulfate present in the resulting solution separated. This separation may be advantageously effected by the use of my process of separating sodium and potassium salts, described and claimed in Patent No. 1,091,033 granted March 24, 1914.

The fumes resulting from heating the feldspar, sodium acid sulfate and reducing agent consisting principally of sulfur dioxid and sulfur trioxid both of which under the conditions described, are believed to be active functioning constituents in effecting the reaction hereinafter set forth are cooled somewhat, preferably to a temperature of from about 212° to 400° F. and are brought into contact with the phosphate rock to be treated. This phosphate rock at a temperature of from about 212° to 400° F., absorbs the fumes with avidity and is thereby transformed into acid phosphate available for use as a fertilizer. It is important to avoid a temperature materially above 400° F. to avoid reversion of the acid phosphate.

The phosphate rock can be advantageously treated with the fumes in a rotary mixer and I prefer to employ a tube furnace without a burner for this purpose, the rock being admitted at one end of the rotating tube and the acid phosphate being delivered at the other end.

The process is preferably carried out in the apparatus shown partly in section and diagrammatically in the accompanying drawing.

In the drawing the numeral 1 designates a rotatable tube of a tube furnace 2. The tube is inclined slightly downwardly toward the forward end of the furnace, whereby material fed into the rear end of the same automatically travels slowly through the tube and is discharged from the forward end thereof. The rear end of this tube is formed open while the forward end is closed by a stationary head or plate 3, provided in its lower portion with a discharge opening 4, adapted to be covered and uncovered by a hinged closure 5 or the like. Rigidly mounted upon the periphery of the rotatable tube 1 are annular tracks 6, engaging supporting rollers 7, as shown. The forward annular track 6, also engages a thrust roller 8 which prevents longitudinal movement of the tube 1 toward its lower end. The tube 1 is rotated by means of a power driven pulley 9 secured upon a shaft 10, having a pinion 11 rigidly mounted thereon.

The pinion 11 engages an annular master gear 12, rigidly mounted upon the periphery of the tube 1, as shown.

The rotatable tube is preferably heated by the combustion of ground coal. This coal is stored within a hopper 13 arranged near and above the forward end of the tube 1, and is withdrawn from the same through tube conveyer 14 and depending vertical chute 15. This chute 15 discharges into a hopper 16, connected with the outer closed end of a burner tube 17, which extends through an opening the stationary plate or head 3, into the forward end of the tube 1, as shown. The ground coal is blown through the burner tube 17 by a rotary fan or blower 18.

A hopper 19 is provided for holding the mixture of feldspar, sodium acid sulfate and reducing agent. This mixture is fed through a tube conveyer 20 and a chute 21, discharging into the rear end of the rotatable tube 1, as shown. The tube conveyer 20 passes through an opening 22 formed through the top of the furnace 2 near its rear end and is rigidly connected with the same by means of a supporting bracket 23.

The open rear end of the tube 1 discharges into a stationary outer shell or casing 24, containing a cooling apparatus of the steam boiler type. This outer shell or casing includes an intermediately disposed annular body portion 25, provided at its ends with outwardly extending annular flanges 26, and heads or ends 27, provided at their inner ends with outwardly extending flanges 28, arranged adjacent the flanges 26 and connected therewith by means of bolts 29 or the like. The rear end of the tube 1 passes through an opening 30 formed in the forward head or end 27, as shown.

Arranged within the shell 24 are spaced tube plates 31, extending between the flanges 26 and 28, and having openings formed therethrough for the passage of the bolts 29. These plates are apertured for receiving the opposite open ends of horizontally arranged tubes or flues 32. I prefer to have the uppermost tube or tubes spaced a substantial distance from the upper portion of the wall of the shell 24, to provide a steam space or dome, from which steam may be withdrawn through valve controlled pipe 33 for use. The water is preferably supplied to the lower portion of the annular portion 25 through a valve controlled pipe or conduit 34. A gage 35 may be employed to indicate the pressure within the boiler. The gases and vapors generated within the tube 1 pass rearwardly through such tube into the forward end 27 of the shell 28, and then through the tubes of flues 32, wherein they are subjected to the action of the cooling water or steam, such gases then passing into the rear head or end 27.

The numeral 36 designates a tube furnace, within which phosphate rock is subjected to the action of fumes from the cooling apparatus. The rotatable tube 37 of the furnace 36 is inclined slightly downwardly toward its forward end, as shown. Near its forward end this tube is provided with a circumferentially increased or outwardly bulging portion 38, forming a pocket through which the phosphate rock passes prior to its final discharge through an outlet 39, whereby the longitudinal movement of the phosphate rock through the tube is suitably retarded at this point. The rear head 27 is provided with a reduced tubular neck 40, extending into the forward open end of the bulging portion 38 of the tube 37, and arranged eccentrically with relation thereto, as shown. The tube 37 and outwardly bulging portion 38 thereof have annular tracks 41 and 42 rigidly mounted upon their peripheries, which engage supporting rollers 43 and 44 respectively. The annular track 42 also engages a thrust roller 45, preventing the longitudinal movement of the tube 37 toward its lower end. Rigidly mounted upon the forward end of the tube 37 is an annular master gear 46, driven by a pinion 47, receiving its rotation from a power driven pulley 48.

The phosphate rock is stored within a suitably supported hopper 49 and is fed therefrom through a tube conveyer 50, and a downwardly extending chute 51, into the rear end of the tube 37, such phosphate rock being made to travel slowly through the inclined tube 37 and bulging portion 38, to finally discharge from the forward end of the bulging portion, by gravity, due to the inclination of the tube 38 and bulging portion thereof.

In carrying out my process in the apparatus illustrated, the finely divided feldspar, together with finely divided sodium acid sulfate and a small amount of the reducing agent, such as carbon, is fed from the hopper 19 into the tube 1 and is there heated to a red heat, preferably to about 1100° F. The heated fumes which are generated in the tube 1 pass through the tubes or flues 32 of the cooling apparatus where they are cooled to a temperature of from 212° and 400° F. the cooling of the gases to the desired temperature being controlled by the regulation of the valve in the water inlet pipe 34. The fumes cooled to the desired temperature are discharged into the forward end of the tube 37 where they come into contact with and react upon the phosphate rock, while it is traveling slowly through the tube 38 thereby transforming it into acid phosphate.

I am aware that patents have been granted on processes of treating bauxite and similar aluminous materials by furnacing them with alkali metal sulfates and carbon but my process contemplates only the use of acid sulfates.

While I have described in detail the preferred practice of my process, it is to be understood that the details of procedure and proportions of reagents may be widely varied and that, while I prefer to carry out the process in the particular form of apparatus shown and described, such apparatus is not essential to the practice of my process.

Having described my invention, I claim:—

1. The herein described process of treating an alkali silicate and phosphate rock which consists in heating feldspathic rock and an alkali metal acid sulfate to a reacting temperature in the presence of a reducing agent and causing the fumes given off during the reaction to react upon phosphate rock.

2. The herein described process of treating feldspathic and phosphate rock, which consists in heating feldspathic rock and an alkali metal acid sulfate to a reacting temperature in the presence of a reducing agent, cooling the fumes given off during the reaction to a temperature of from about 212° to 400° F. and causing such fumes to react upon phosphate rock.

3. The herein described process of treating feldspar and phosphate rock, which consists in mixing feldspar and sodium acid sulfate in approximately the proportions of 50 parts by weight of feldspar to 100 parts by weight of sodium acid sulfate, heating the mixture to a reacting temperature in the presence of a reducing agent and causing the fumes given off during the reaction to react upon phosphate rock at a temperature of from about 212° to 400° F.

4. The herein described process of treating feldspar or phosphate rock which consists in heating feldspar and sodium acid sulfate to approximately a red heat in the presence of a reducing agent, cooling the fumes given off during the reaction to a temperature of from about 212° to 400° F. and causing such fumes to react upon phosphate rock.

5. The herein described process of treating feldspar and phosphate rock which consists in mixing feldspar, sodium acid sulfate and carbonaceous matter in approximately the proportions of 50 parts by weight of feldspar, 100 parts by weight of sodium acid sulfate and 1 to 3 parts by weight of carbonaceous matter, heating the mixture to approximately a red heat and causing the fumes given off during the reaction to react upon phosphate rock at a temperature of from about 212° to 400° F.

6. In the herein described process, the step of heating material containing an insoluble potassium compound and an alkali metal acid sulfate to a reacting temperature in the presence of a reducing agent.

7. In the herein described process, the step of heating feldspathic rock and sodium acid sulfate to approximately a red heat in the presence of a reducing agent.

8. In the herein described process, the step of mixing feldspar and sodium acid sulfate, in the approximate proportions of 50 parts by weight of the feldspar and 100 parts by weight of the sodium acid sulfate and heating the mixture to approximately a red heat in the presence of a reducing agent.

9. In the herein described process, the step of mixing feldspar, sodium acid sulfate and carbonaceous matter in the approximate proportions of 50 parts by weight of feldspar, 100 parts by weight of sodium acid sulfate and from 1 to 3 parts by weight of carbonaceous matter and heating the mixture to approximately a red heat whereby the insoluble potassium salts present are rendered soluble in water and fumes are involved capable of reacting upon phosphate rock to render the same available for use as a fertilizer.

In testimony whereof I affix my signature in presence of two witnesses.

HARRY P. BASSETT.

Witnesses:
J. P. CURLEY,
WILLIAM S. LEVY.